Figure 1:
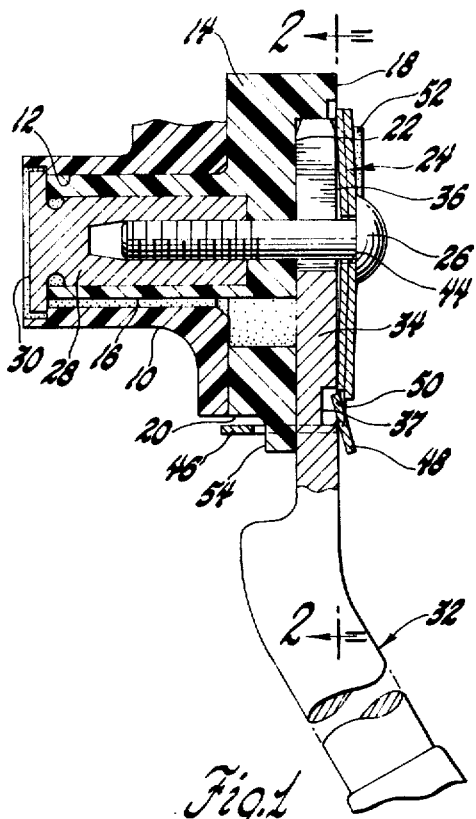

United States Patent
Frier et al.

[11] 3,918,322
[45] Nov. 11, 1975

[54] SNAP-IN LEVER ASSEMBLY

[75] Inventors: Frank Frier; Willard E. Graddy, both of Anderson; Daniel W. Hyden, Indianapolis, all of Ind.

[73] Assignee: General Motors Corporation, Detroit, Mich.

[22] Filed: Dec. 13, 1973

[21] Appl. No.: 426,729

[52] U.S. Cl. ................................ 74/519; 403/260
[51] Int. Cl.² .................. G05G 01/04; B25G 03/00
[58] Field of Search ............. 74/519, 523, 491, 548, 74/550; 403/256, 257, 258, 259, 260

[56] References Cited
UNITED STATES PATENTS

| | | | |
|---|---|---|---|
| 1,757,412 | 5/1930 | Collins | 403/256 |
| 2,967,046 | 1/1961 | Ratcliff | 74/519 X |
| 3,198,183 | 8/1965 | Ball | 74/519 X |
| 3,521,349 | 7/1970 | Gehring | 403/260 X |

FOREIGN PATENTS OR APPLICATIONS

| | | | |
|---|---|---|---|
| 805,180 | 12/1958 | United Kingdom | 74/519 |
| 1,030,631 | 5/1966 | United Kingdom | 403/258 |
| 1,223,113 | 5/1968 | United Kingdom | 403/258 |

*Primary Examiner*—Benjamin W. Wyche
*Assistant Examiner*—P. S. Lall
*Attorney, Agent, or Firm*—Warren D. Hill

[57] ABSTRACT

The yoke of a vehicle turn signal mechanism has an elongated cavity for receiving the end of a turn signal lever. A spring clip secured to the yoke retains the lever end in the cavity and allows the assembly and removal of the lever by a sliding movement along the axis of the elongated cavity.

3 Claims, 5 Drawing Figures

SNAP-IN LEVER ASSEMBLY

This invention relates to a snap-in lever assembly and more particularly to such an assembly suitable for attachment of a turn signal lever to a turn signal actuator.

In conventional automotive vehicles a turn signal actuator is situated on the steering column beneath the steering wheel and enclosed in a housing. Usually the turn signal lever is secured to the actuator by a screw so that in order to effect assembly to the actuator or removal therefrom, it is necessary to first remove the steering wheel to provide access to the screw which holds the lever to the actuator. To facilitate assembly operations and to render servicing and repair more convenient, it is desirable to provide a lever assembly in which the lever may be assembled and disassembled while the steering wheel is in place.

It is therefore a general object of this invention to provide a lever assembly wherein a lever may be secured within a cavity of a turn signal actuator or other body and retained therein by a spring clip.

Another object of the invention is to provide such a lever assembly wherein the lever may be assembled to the body by axially sliding the lever into the cavity in the body to snap into place and to be removed by deforming the spring clip by a tool operating on an exposed portion of the spring clip.

The invention is carried out by providing a turn signal actuator body or other body having an elongated cavity, a spring clip over the cavity and secured to the body, and a lever having a terminal portion conforming to the cavity and slidably insertable therein and engageable by the spring clip for retention within the cavity. The invention further contemplates an exposed portion of the spring clip for engagement by a tool to effect release of the spring clip and sliding removal of the lever.

Figure 2:
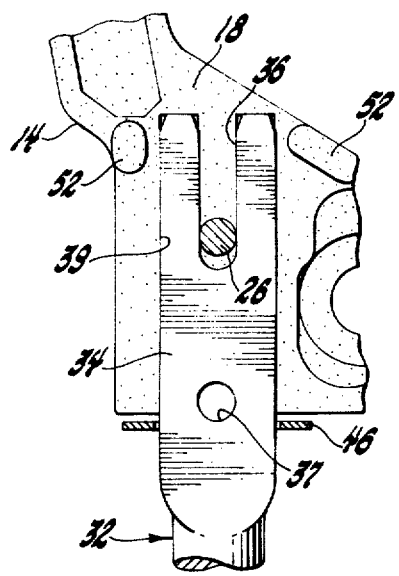
Figure 3:
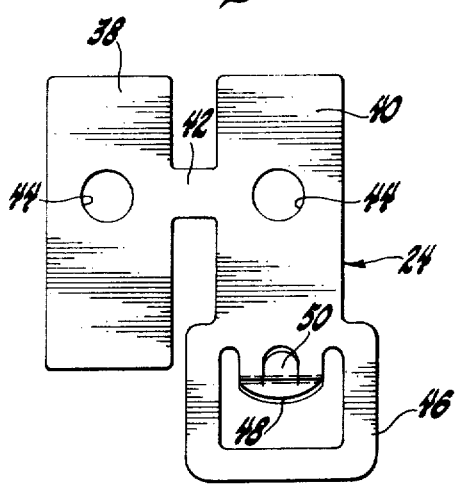
Figure 4:
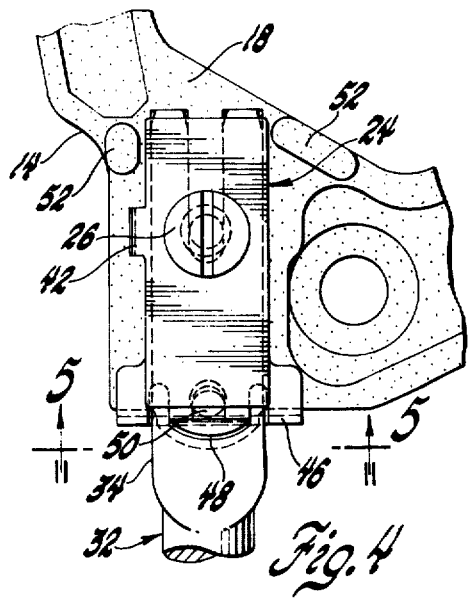
Figure 5:
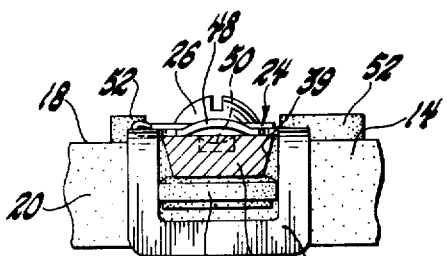

The above and other advantages will be made more apparent from the following specification taken in conjunction with the accompanying drawings wherein like reference numerals refer to like parts and wherein:

FIG. 1 is a cross-sectional elevation view of a portion of a turn signal actuator and lever incorporating the lever assembly according to the invention, FIG. 2 is a view of the lever assembly taken along line 2—2 of FIG. 1, FIG. 3 is a view of a blank used for forming a spring clip for the lever assembly of FIG. 1, FIG. 4 is a plan view of the assembly of FIG. 1, and FIG. 5 is a view of the assembly taken along line 5—5 of FIG. 4.

Referring to FIGS. 1, 2 and 4, a stationary turn signal actuator base 10 contains a bore 12. A turn signal actuator body or yoke 14 includes a tubular boss 16 mating with the bore 12 to allow pivotal action of the yoke 14 with the base 10. The yoke 14 is bounded by an outer surface 18 and an end wall 20. A generally rectangular cavity 22 in the yoke 14 opens into both the surface 18 and the end wall 20. A spring slip 24 slightly wider than the cavity 22 and about the same length as the cavity covers the cavity 22 adjacent the surface 18 and is retained to the yoke by a screw fastener 26. A threaded nut 28 disposed within the tubular boss 16 engages the screw fastener 26 and has a flanged head 30 in contact with a portion of the base 10 for securing the assembly of the base 10, the yoke 14 and the clip 24. A turn signal lever 32 has an end portion 34 of generally oblong flat configuration which is dimensioned to snugly nest within the cavity 22 beneath the spring clip 24. As shown in FIG. 2, the lever end portion 34 is bifurcated to define a slot 36 to provide clearance around the fastener 26 thereby allowing the end portion 34 to axially slide into the cavity from the direction of the end wall 20. The lever end portion 34 also contains a circular recess 37 adjacent the spring clip 24. The walls 39 of the cavity as shown in FIG. 5 taper inwardly toward the bottom of the cavity, and the lever end portion 34 is similarly tapered on each side to conform to the cavity.

The spring clip 24 is formed from a blank shown in FIG. 3 which comprises upper and lower generally rectangular parts 38 and 40, respectively, interconnected by a strap 42. Each part 38 and 40 has a generally centrally located aperture 44 dimensioned to receive the fastener 26. The lower part 40 has a U-shaped appendage 46 at one end of greater width than the remainder of the part 40. The same end of the part 40 has an ear 48 extending partially into the space defined by the U-shaped appendage 46. To form the clip from the blank, the U-shaped portion 46 is bent downwardly at right angles to the remainder of the part 40 while the ear 48 is slightly bent up. A tang 50 is formed into the part 40 to extend downwardly into the recess 37 upon assembly. The part 38 is folded over the part 40, the strap 42 serving as a hinge element and the thus formed double layered portion of the clip is deformed into a concave configuration as seen in FIG. 1. Finally, the clip, which is formed of 1065 steel, is heat treated to achieve a Rockwell 15N-83 hardness, thereby imparting to the clip a substantial stiffness.

Raised bosses 52 on the surface 18 of the yoke lie adjacent one end of the clip when assembled to the yoke. As best shown in FIGS. 1 and 5, a lateral projection 54 from the side wall 20 extends into the opening defined by the U-shaped portion 46. The projection 54 extends nearly the full width of the opening but is spaced from the bottom thereof. During assembly of the clip to the yoke 14, the bosses 52 and the projection 54 assist in locating the clip and after the fastener 26 is inserted, help maintain the position of the clip.

To assemble the lever 32 to the yoke 14, the terminal portion 34 is inserted axially into the cavity under the spring clip 24, the upturned ear 48 serving as a guide. When the terminal portion is fully inserted into the cavity, the tang 50 snaps into the circular recess 37 in the terminal portion to prevent removal of the lever. The concave spring clip is sufficiently tensioned by the fastener 26 so that each end of the spring clip engages the terminal portion 34 and biases it firmly into the cavity 22. The tapered side walls 39 of the cavity 22 and the similar mating surface of the terminal portion 34 engage tightly when the lever is biased into the cavity to assure a tight fit.

Removal of the lever 32 from the yoke 14 is readily accomplished by using a screwdriver or the like to push upwardly on the bottom of the U-shaped portion 46 to release the tang 50 from the circular recess 37 in the terminal portion 34 thereby allowing sliding removal of the lever 32. The projection 54 limits the movement of the U-shaped portion 46 to prevent destructive stresses on the spring clip.

It will thus be seen that the snap-in lever assembly provides a convenient manner of assembling and removing the turn signal lever with the yoke of a turn signal actuator while the vehicle steering wheel is in place and the actuator is inaccessible from all directions except in the specific region where the lever extends from the assembly. It will further be seen that the principles of this invention are not limited to turn signal actuators in a vehicle but are applicable to other lever assemblies as well.

The embodiment of the invention described herein is for purposes of illustration and the scope of the invention is intended to be limited only by the following claims.

We claim:

1. A snap-in lever assembly comprising
a body having a surface and an adjacent side wall, an elongated cavity formed in the surface and extending through the side wall,
a lever having an elongated terminal portion formed to nest within the cavity,
and means for enabling insertion of the terminal portion into the cavity and for rigidly securing the lever to the body including
a spring clip having a body portion disposed over the cavity and substantially coextensive therewith and having a depending tang formed in the spring clip and extending toward the cavity and
fastener means extending through the spring clip and through the cavity for securing the spring clip to the actuator body,
the terminal portion of the lever having a bifurcated end for providing clearance between the terminal portion and the fastener means and for permitting sliding insertion of the terminal portion into the cavity under the spring clip with the bifurcated end straddling the fastener, and having a recess for receiving the tang of the spring clip for preventing removal of the lever.

2. A snap-in lever assembly comprising
a body having a surface and an adjacent side wall, an elongated cavity formed in the surface and extending through the side wall,
a lever having an elongated terminal portion formed to nest within the cavity,
and means for enabling insertion of the terminal portion into the cavity and for rigidly securing the lever to the body including
a spring clip having a body portion disposed over the cavity and substantially coextensive therewith and having a depending tang formed in the spring clip and extending toward the cavity and
fastener means extending through the spring clip and through the cavity for securing the spring clip to the actuator body,
the terminal portion of the lever having a bifurcated end for providing clearance between the terminal portion and the fastener means and for permitting sliding insertion of the terminal portion into the cavity under the spring clip with the bifurcated end straddling the fastener, and having a recess for receiving the tang of the spring clip for preventing removal of the lever, and
the spring clip being slightly concave toward the cavity and being resiliently biased by the fastener means against the terminal portion of the lever whereby the terminal portion is firmly seated in the cavity.

3. A snap-in lever assembly comprising
a body having a surface and an adjacent side wall, an elongated cavity formed in the surface and extending through the side wall,
a lever having an elongated terminal portion formed to nest within the cavity,
and means for enabling insertion of the terminal portion into the cavity and for rigidly securing the lever to the body including
a spring clip having a body portion disposed over the cavity and substantially coextensive therewith and having a depending tang formed in the spring clip and extending toward the cavity and
fastener means extending through the spring clip and through the cavity for securing the spring clip to the actuator body,
the terminal portion of the lever having a bifurcated end for providing clearance between the terminal portion and the fastener means and for permitting sliding insertion of the terminal portion into the cavity under the spring clip with the bifurcated end straddling the fastener, and having a recess for receiving the tang of the spring clip for preventing removal of the lever,
the spring clip being slightly concave toward the cavity and being resiliently biased by the fastener means against the terminal portion of the lever whereby the terminal portion is firmly seated in the cavity, and
an end of the spring clip body supporting an integral U-shaped member depending at a right angle therefrom and defining an opening through which the lever extends, the depending tang being located near the same end of the body portion which supports the U-shaped member whereby the tang may be retracted from the recess in the lever to allow removal of the lever by moving the U-shaped member toward the lever to bias that one end of the spring clip body away from the lever.

* * * * *